UNITED STATES PATENT OFFICE.

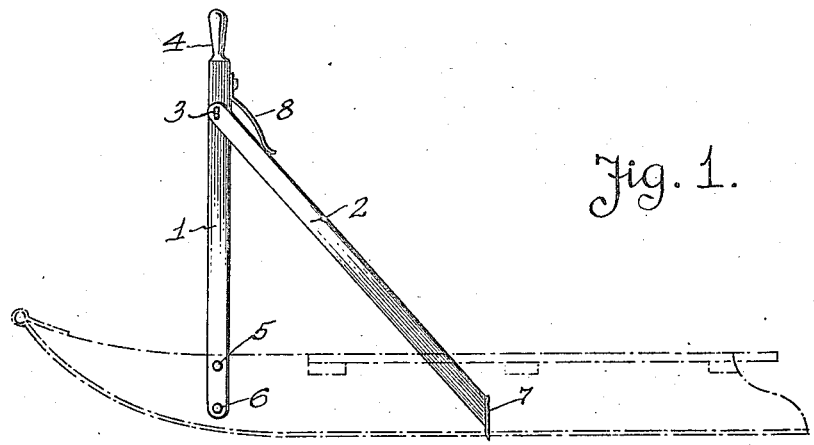
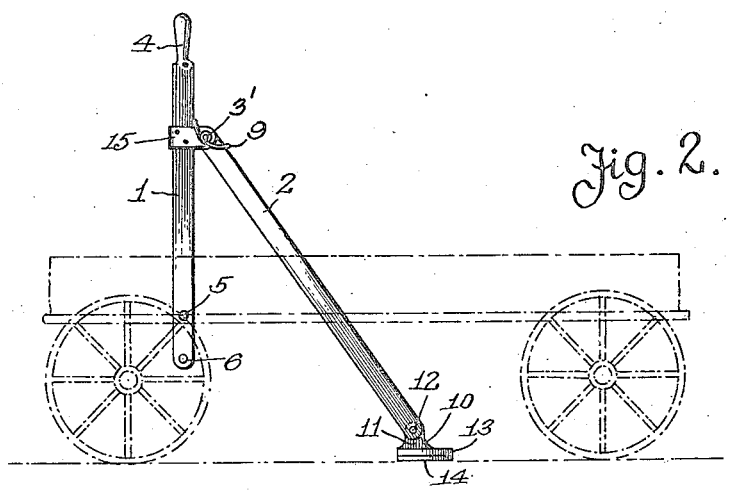
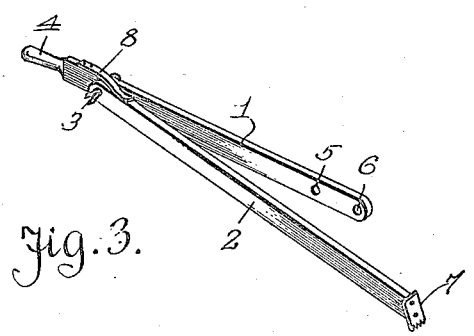

FREDERIC S. SEAGRAVE, OF DETROIT, MICHIGAN.

PROPELLING ATTACHMENT FOR CHILDREN'S VEHICLES.

1,419,312.  Specification of Letters Patent.  Patented June 13, 1922.

Application filed October 13, 1919. Serial No. 330,198.

*To all whom it may concern:*

Be it known that I, FREDERIC S. SEAGRAVE, a citizen of the United States of America, residing at Detroit, in the county of Wayne and State of Michigan, have invented certain new and useful Improvements in Propelling Attachments for Children's Vehicles, of which the following is a specification, reference being had therein to the accompanying drawings.

This invention relates to an attachment for children's sleds, sleighs, wagons, carts and other vehicles for use in propelling the vehicle, and its object is to provide a very simple and efficient device for the purpose which may be quickly and easily attached to any of the common forms of the above mentioned amusement devices for children without altering the construction of the vehicle and by any unskilled person. A further object is to provide a simple and compact construction which may be folded into a small space for shipping and which may be constructed from refuse or other cheap stock available in the ordinary wood working plant. It is also an object of the invention to provide certain other new and useful features in the construction and arrangement of the parts.

With the above and other ends in view, the invention consists in the matters hereinafter set forth and more particularly pointed out in the appended claim, reference being had to the accompanying drawing, in which—

Figure 1 is a side elevation of an attachment illustrative of the invention and showing the same as adaptable for use in propelling a child's sled;

Fig. 2 is a view similar to Fig. 1 showing a slight modification and illustrating the device as applicable for use in propelling a child's wagon, and Fig. 3 is a perspective view of the device detached and in folded position.

As illustrated in the drawing, the attachment comprises mainly a rocker lever or bar 1 and a ground engaging or propelling bar or member 2 which is pivotally attached at 3 in any suitable manner to the lever 1 intermediate the ends thereof and preferably adjacent its upper end. The lever 1 may be formed at its upper end with a hand grip portion 4, if found desirable, and near its lower end is provided with a pivot opening or hole 5 to receive a pivot pin or bolt (not shown) for pivotally attaching the bar or lever to a child's vehicle.

At its lower extremity the lever 1 may be provided, if found desirable, with an opening 6 to receive a pin or cross bar (not shown) upon which the child may place his foot or feet to assist in rocking or turning the lever upon the pivot 5 in propelling the vehicle.

The lower or free end of the propelling member, brace, or leg 2 is provided with means for engaging the ground or surface over which the vehicle is to be propelled, said means, as shown in Fig. 1 being a metal plate 7 having a sharp and preferably serrated lower edge which plate is secured to the end of the bar in any suitable manner, and is particularly adapted for engaging the ice or other smooth slippery surface over which the sled is to be propelled. A flat steel spring 8 is attached to one of the members 1 and 2 near the pivot 3 with its free end engaging the other member, to exert a force tending to turn these members into longitudinal alignment and therefore, when the attachment is in place upon the vehicle, will yieldingly hold the plate 7 pressed into engagement with the surface over which the sled in being propelled.

One or more of these attachments may be applied to a sled or other child's vehicle and when two of such attachments are used they will preferably be secured to opposite runners or sides of the sled or opposite sides of the running gear or box of the wagon or other vehicle, and these two attachments may, if found desirable, be connected by a cross bar or pin inserted in the openings 6 so that the two attachments may be operated simultaneously and the child may place his feet upon the cross bar at 6 which is below the pivotal attachment 5 of the levers, and assist in swinging the levers upon this pivot. The child sitting upon the sled or other vehicle to which the attachment is applied, grasps the upper end of the lever 1 swinging it backward and forward, the propelling bar or leg 2 dragging along the ground in contact therewith at its lower end as the bar 1 is swung forwardly and upon a backward swinging of said bar or lever, the plate 7 will engage the ground and cause the vehicle to be propelled forwardly.

When it is desired to use the vehicle in the ordinary way, the attachment may be folded rearwardly into a horizontal position along-side the vehicle where it will be out of the way and will not hinder the use of the vehicle or its propulsion in any other manner.

The leg 2 is so attached to the lever 1 that they may be folded into parallelism, thus making a very compact package for shipment.

In Fig. 2 a modified form of spring is shown, said spring 9 being formed of spring wire with its intermediate portion formed into a loop or eye embracing the pivot 3' and its ends engaged over the lever 1 and bar 2. If desired, the bar 2 may be pivotally attached to the lever 1 by means of a suitable metal bracket 15 secured to the lever and having an ear or ears forming a bearing for the pivot 3' which may be an ordinary cotter pin.

When it is desired to use the attachment for propelling a child's cart or wagon over a hard surface, such as a pavement or concrete walk, or over a surface which would be injured by the contact of the sharp plate 7 therewith, a pivoted foot 10, as shown in Fig. 2, is employed. This foot member has an upwardly extending ear 11 to receive a pivot 12 which engages an opening in the ear and an opening in the end of the leg 2. The foot 10 is also formed with a horizontal plate 13 forming an extended flat lower surface upon which is secured in any suitable manner a thickness 14 of rubber or other suitable material adapted to engage the surface over which the vehicle is to be propelled and prevent the foot from slipping thereon as power is applied to the leg 12 in propelling the vehicle.

The plate 13 is preferably extended rearwardly of a vertical plane passing through the pivot 12 a greater distance than it extends forwardly therefrom so that when pressure is applied to the foot in propelling the vehicle, the foot will not be turned or tilted thereby upon the pivot but will hug the ground surface closely.

Obviously changes may be made in the particular size, form or proportion of the parts shown and in the arrangement thereof, within the scope of the appended claim, without departing from the spirit of the invention and I do not therefore limit myself to the particular construction shown.

Having thus fully described my invention, what I claim is:

A propelling attachment for child's vehicles, comprising a lever member having means for pivotally attaching said member to a vehicle, a propelling member pivotally attached to the lever member at its upper end and intermediate the ends of the lever member, a foot member pivotally attached adjacent its forward end to the lower end of said propelling member and having a substantially flat lower surface to engage the surface over which the vehicle is propelled, whereby when said foot is raised by said propelling member, said foot will be turned by gravity with its flat lower surface inclined forwardly and upwardly.

In testimony whereof I affix my signature in the presence of two witnesses.

FREDERIC S. SEAGRAVE.

Witnesses:
LEWIS E. FLANDERS,
ANNA M. DORR.